(12) United States Patent
Eriksson et al.

(10) Patent No.: US 7,418,278 B2
(45) Date of Patent: Aug. 26, 2008

(54) HAND-PORTABLE DEVICES AND COVERS FOR HAND-PORTABLE DEVICES

(75) Inventors: Timo Eriksson, Tokyo (JP); Kenichi Hashizume, Yoshioka Town (JP)

(73) Assignee: Nokia Corporation, Espoo (FI)

( * ) Notice: Subject to any disclaimer, the term of this patent is extended or adjusted under 35 U.S.C. 154(b) by 320 days.

(21) Appl. No.: 10/737,137

(22) Filed: Dec. 16, 2003

(65) Prior Publication Data

US 2005/0130722 A1    Jun. 16, 2005

(51) Int. Cl.
*H04M 1/00* (2006.01)

(52) U.S. Cl. .................... 455/575.1; 310/317; 310/365; 310/366; 277/628

(58) Field of Classification Search ... 455/575.1–575.9; 379/429, 433.11, 437; 310/317; 277/628
See application file for complete search history.

(56) References Cited

U.S. PATENT DOCUMENTS

| 6,249,076 | B1 | 6/2001 | Madden et al. | 310/363 |
| 6,876,543 | B2 * | 4/2005 | Mockridge et al. | 361/679 |
| 2002/0050769 | A1 | 5/2002 | Pelrine et al. | 310/363 |
| 2002/0062547 | A1 * | 5/2002 | Chiodo et al. | 29/426.5 |
| 2002/0175594 | A1 * | 11/2002 | Kornbluh et al. | 310/317 |
| 2004/0074069 | A1 * | 4/2004 | Browne et al. | 24/442 |
| 2004/0075581 | A1 * | 4/2004 | Staniszewski | 340/932.2 |

FOREIGN PATENT DOCUMENTS

| JP | 11-39053 | * | 2/1999 |
| JP | 11039053 A | * | 2/1999 |

OTHER PUBLICATIONS

Kornbluh et al., "Electrostrictive Polymer Artificial Muscle Actuators", SRI International, Menlo Park CA, 9 pgs.
"Conducting Polymer Actuators (Artificial Muscles)" from Internet website www.eamex.co.jp, 3 pgs.
Yong, T., et al., "Electric-Driven Polymeric Materials", Chemical Novelty Materials, vol. 28, Issuance 12, Dec. 31, 2000, 4 pgs.

* cited by examiner

*Primary Examiner*—William G. Trost
*Assistant Examiner*—Ariel Balaoing
(74) *Attorney, Agent, or Firm*—Harrington & Smith, PC

(57) ABSTRACT

A hand portable device such as a mobile telephone 10 includes an engine assembly 12 and a cover 14, 16 for encasing the engine assembly. The device 10 further includes a closing arrangement 44, 45, 46, 50 alterable between a first condition in which it retains the cover 14, 16 on the engine assembly 12 and a second condition in which it allows at least a part 14 of the cover to be removed from the engine assembly 12, the closing arrangement including a polymer actuator 50, the configuration of which may be altered to alter the condition of the closing arrangement.

25 Claims, 3 Drawing Sheets

HAND-PORTABLE DEVICES AND COVERS FOR HAND-PORTABLE DEVICES

FIELD OF THE INVENTION

Embodiments of the present invention relate to hand-portable devices and to covers for hand-portable devices. Further embodiments of the invention relate to methods of assembly and disassembly of such devices. One application of the invention is in mobile telephones and covers for mobile telephones.

BACKGROUND TO THE INVENTION

A mobile telephone includes an engine assembly, which includes the telephone's circuitry, and a cover which encases the engine assembly, the cover conventionally being made of a rigid plastics material. The cover is assembled around the engine assembly when the telephone is first manufactured and disassembled from the engine assembly when the telephone is disposed of. In addition, there has recently been a trend in the mobile telephone industry of giving users the ability to alter the appearance of their telephones, in particular by changing the covers. It is therefore desirable that a mobile telephone cover can be assembled and disassembled by a user.

Other hand-portable devices, such as personal digital assistants (PDAs), also include an engine assembly including the device's circuitry, and a cover encasing the engine assembly.

It is known to provide mobile telephones with removable covers consisting of upper and lower parts which are maintained in place around the engine assembly by mechanical connections to each other and/or to the engine assembly. Such mechanical connections can be relatively complex to manufacture and to assemble/disassemble.

BRIEF SUMMARY OF THE INVENTION

According to one aspect of the invention there is provided a hand-portable device including:
   an engine assembly;
   a cover for encasing the engine assembly; and
   a closing arrangement alterable between a first condition in which it retains at least a part of the cover on the engine assembly and a second condition in which it allows the part of the cover to be removed from the engine assembly;
   the closing arrangement including a polymer actuator which is alterable between a first configuration and a second configuration to alter the closing arrangement between the first and second conditions respectively.

The polymer actuator may include an electroactive polymer, this being a polymer which is capable of converting electrical to mechanical energy.

The closing arrangement may include means for altering the configuration of the polymer actuator between the first configuration and the second configuration by selectively applying a voltage to the polymer actuator.

The polymer actuator may include a conductive polymer.

The polymer actuator may further include an electrolyte sandwiched between the two electrodes. One of the electrodes may comprise the conductive polymer.

The polymer actuator may be bistable, such that voltage may be applied to alter it between its first and second configurations, but application of voltage is not necessary to maintain it in either its first or its second configuration.

In its first configuration, the polymer actuator may mechanically retain the cover on the engine assembly.

The hand-portable device may be configured such that when the closing arrangement is in the second condition, at least a part of the cover is forced out of contact with the engine assembly.

The hand-portable device may include input means for allowing the input of security information to control the alteration of the polymer actuator between its first and second configurations.

The security information may comprise a code such as a numeric, alpha or alphanumeric code, which may be input via a user input of the hand-portable device.

Alternatively or additionally, the hand-portable device may include a receiver for receiving the security information from a remote source such as an external device or via a communications network.

The hand-portable device may be configured such that it becomes partially or completely non-functional if the cover is removed from the engine assembly in the absence of the input of predetermined security information.

The cover may include at least two cover parts which are detachable from the engine assembly. The cover may be retained on the engine assembly by attaching the cover parts together to encase the engine assembly. Alternatively, the cover may be retained on the engine assembly by attaching each cover part to the engine assembly.

Alternatively, the cover may include one part which is permanently attached to the engine assembly and one part which is detachable from the engine assembly. The cover may be retained on the engine assembly by attaching the detachable part to the other part or to the engine assembly.

The closing arrangement may selectively retain together first and second closure portions of the hand-portable device, in order to selectively retain the part of the cover on the engine assembly. The first closure portion may be on one cover part and the second closure portion on the other cover part. Alternatively, the first closure portion may be on one of the cover parts and the second closure portion on the engine assembly.

The hand-portable device may be configured such that when the two closure portions are retained together by the closing arrangement, a waterproof seal is formed between the closure portions.

The polymer actuator may be located in one of the closure portions. The other closure portion may be shaped to define a recess into which the polymer actuator may extend when in its first configuration, to retain the two closure portions together and thereby retain the cover on the engine assembly.

Each cover part of the hand-portable device may include a body portion for covering a back or front of the engine assembly and a perimeter portion, the respective perimeter portions contacting one another when the cover encases the engine assembly. The perimeter portions of the cover parts may comprise the closure portions.

The polymer actuator may extend substantially around the perimeter portion of one cover part and the recess may extend substantially around the perimeter portion of the other cover part, the polymer actuator on the one cover part selectively extending into the recess on the other cover part to retain the two cover parts together.

Alternatively, a plurality of discrete polymer actuators may be provided around the perimeter portion of one cover part, with complementary recesses being provided on the other cover part.

According to the invention, there is further provided a cover part for a hand-portable device according to any of the preceding definitions, the cover part including a polymer actuator, the configuration of which may be altered to alter the condition of the closing arrangement of the hand-portable device.

According to a further aspect of the present invention, there is provided a method of assembly and disassembly of a hand-portable device including an engine assembly, a cover for encasing the engine assembly and a closing arrangement comprising a polymer actuator having a first configuration and a second configuration, the method including the step of altering the configuration of the polymer actuator between the first and second configurations, to alter the closing arrangement between a first condition in which it retains at least a part of the cover on the engine assembly and a second condition in which the part of the cover may be removed from the engine assembly.

The method may include the step of altering the configuration of the polymer actuator by the selective application of a voltage to the polymer actuator.

The selective application of the voltage may be controlled by the input of security information to the hand-portable device. The security information may be input via a user input of the hand-portable device. Alternatively, the security information may be input from a remote source such as an external device or via a communications network.

According to a further aspect of the invention there is provided a hand-portable device including an engine assembly and a cover encasing the engine assembly, the cover being formed in at least two parts and the device including a sealing arrangement for sealing between the two parts or between one of the cover parts and the engine assembly, the sealing arrangement including a polymer actuator.

BRIEF DESCRIPTION OF THE DRAWINGS

For a better understanding of the present invention and to understand how the invention can be practiced, reference will now be made by way of example only to the accompanying drawings of embodiments of the invention in which.

DETAILED DESCRIPTION OF THE INVENTION

Figure 1A:
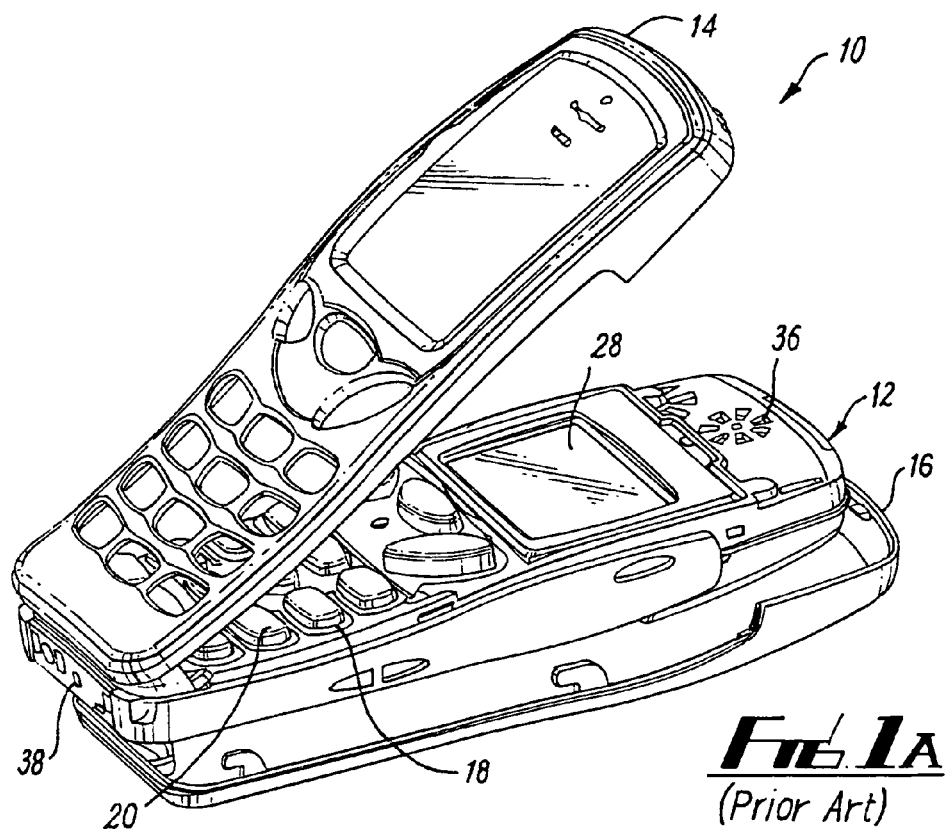
FIGS. 1a and 1b are diagrammatic perspective views of prior art mobile telephones illustrating user replaceable plastic covers.

FIG. 1a shows an example of a prior art mobile cellular telephone 10 comprising an engine assembly 12 enclosed by a removable rigid plastic front cover 14 and a removable rigid plastic back cover 16. The front cover 14 is illustrated in a part-open position, to reveal the engine assembly 12. A loose keypad 18 overlies keyboard switches 20 (key domes) of the engine assembly 12 and is held is place by the rigid plastic front cover 14 in the assembled telephone.

Figure 2:
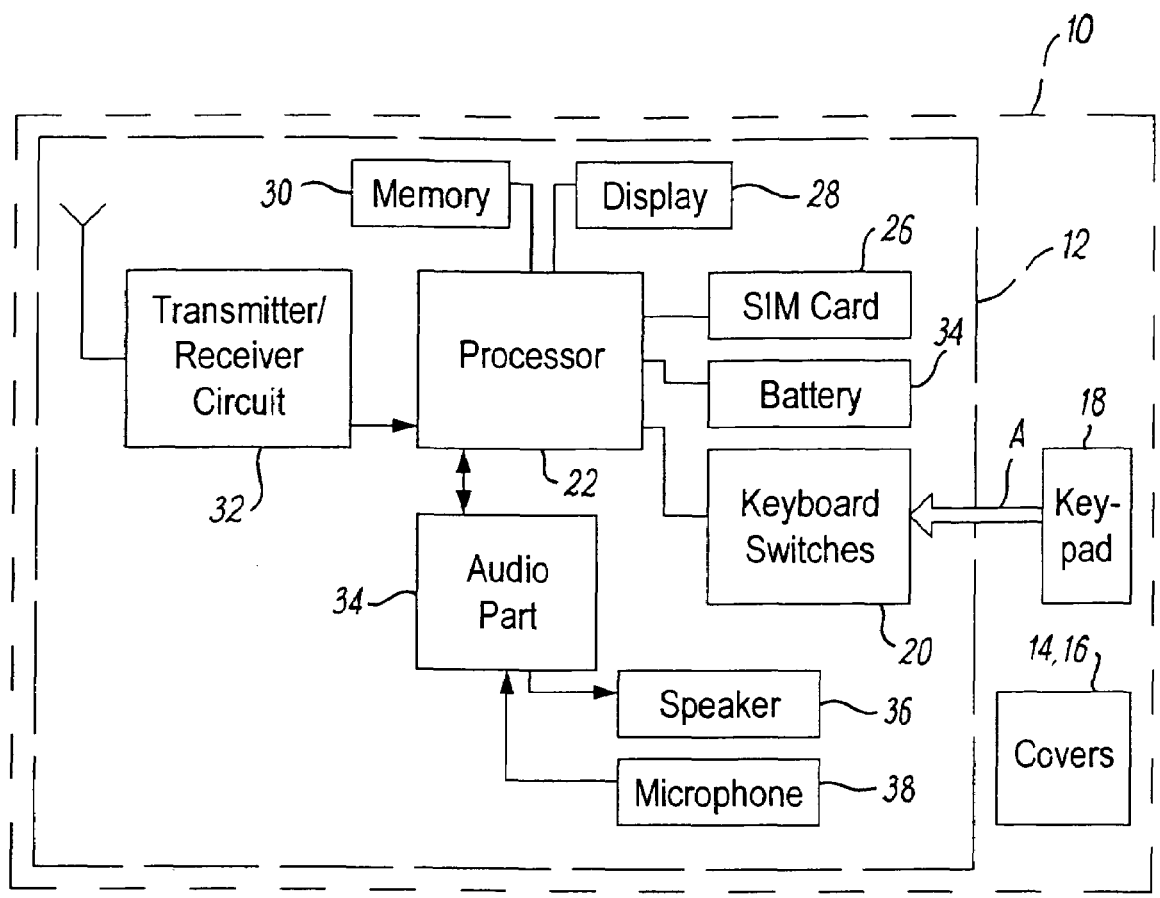
FIG. 2 is a schematic diagram illustrating the relationships between the various components of the prior art telephone.

The components of the prior art telephone 10, and the engine assembly 12 in particular, are schematically illustrated in FIG. 2. The engine assembly 12 is in physical connection with the keypad 18 as shown by arrow A. The engine assembly 12 includes a plurality of keyboard switches 20 which are electrically connected to a processor 22. The processor 22 is electronically connected a SIM card 26, to a display 28, and to a memory 30 and is also connected to a battery 34 for power distribution to other circuitry. Radio transceiver circuitry 32 for communicating in a cellular communications network is also electrically connected to the processor 22. An audio part 34, which is also electrically connected to the processor 22, provides an electrical signal to a speaker 36 and receives an electrical signal from a microphone 38.

The inter-operation of the above parts to operate as a cellular mobile telephone is well known to persons skilled in the art, who will additionally appreciate that although a GSM compliant engine assembly 10, as in this example, has a SIM card 26 it may not be present in engine assemblies for other cellular communication standards.

Figure 1B:
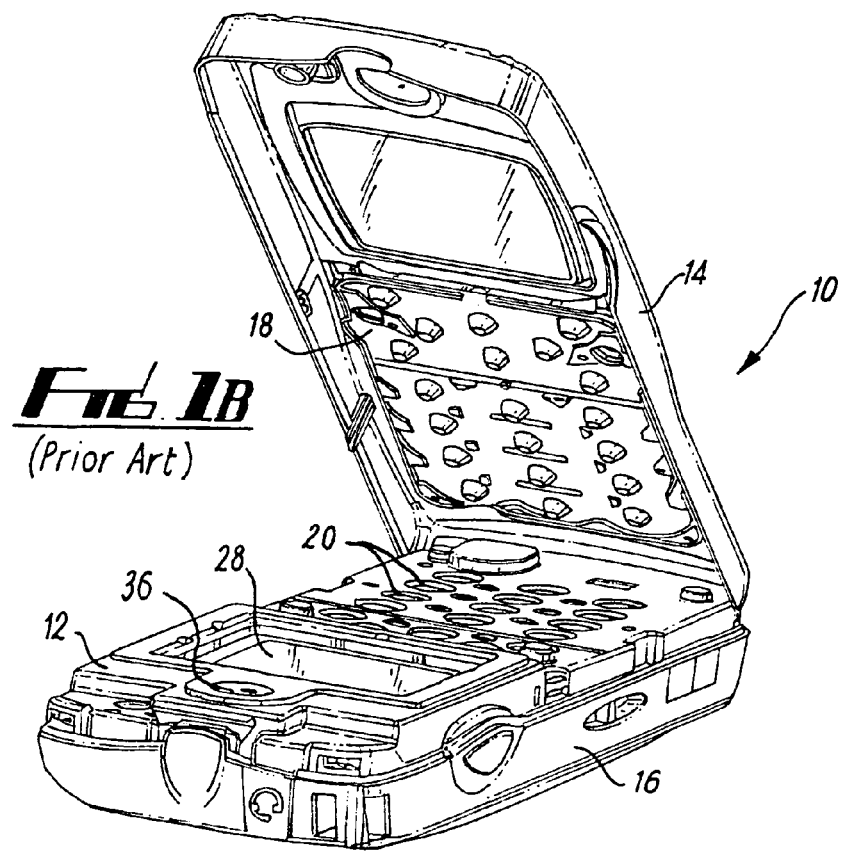

FIG. 1b shows an alternative design of covers 14, 16 for the telephone 10. In this example, the rigid plastic back cover 16 is permanently attached to the engine assembly 12 and is not removable. The rigid plastic front cover 14 is removable and a loose keypad 18 is located between it and the engine assembly 12 when the telephone 10 is assembled.

The rigid plastic covers 14 and 16 are three-dimensional and provide a recognisable shape to the telephone. They additionally may protect the engine assembly 12 against damage and water ingress and are easily made by injection moulding. For these reasons rigid covers, and plastic covers in particular, are substantially universally used to enclose the engine assembly 12.

Referring to FIGS. 3a to 4b, there is illustrated a hand-portable device in the form of a mobile cellular telephone 10 according to a first embodiment of the invention. Although in this embodiment the hand portable device is a mobile telephone, in other embodiments it may be another type of device such as a personal digital assistant (PDA).

The telephone 10 includes an engine assembly 12 as in the prior art telephone, the engine assembly 12 not being illustrated in any detail in FIGS. 3a to 4b. The engine assembly 12 is encased between a front cover part 14 and a back cover part 16. The cover parts 14 and 16 are shaped to fit snugly around the engine assembly 12, sandwiching the engine assembly 12 between the two cover parts.

The front cover part 14 includes a main body portion 40, which in use overlies the front of the engine assembly, and a perimeter portion 42 which extends around an edge of the body portion 40. The perimeter portion 42 includes a flange 44 extending downwardly from the body portion 40 in normal use and an in-turned lip 46 extending inwardly from the flange 44. An elongate recess 45 is thereby defined between the lip 46 and the body portion 40, the recess 45 extending right around the perimeter portion 42 of the front cover 14. The flange 44, lip 46 and recess 45 form part of a closing arrangement as described in more detail below.

The back cover part 16 also includes a body portion 41 which in use overlies the back of the engine assembly, and a perimeter portion 43 extending generally around an edge of the body portion. The back cover part 16 further includes a polymer actuator 50 which extends around the perimeter portion 43. The polymer actuator 50 also forms part of the closing arrangement, as described below.

The polymer actuator 50 includes an electroactive, electrically conductive polymer 54, in the shape of an elongate, endless loop extending around the perimeter portion 42 of the cover part 14. The polymer actuator 50 further includes a solid electrolyte 52, also in the shape of an elongate endless loop, and a metal electrode 56, the electrolyte 52 being sandwiched between the metal electrode 56 and the conductive polymer 54 (which also functions as an electrode). The conductive polymer 54 and the metal electrode 56 are connected to a DC voltage source 58 such that a voltage may be applied to the polymer actuator 50.

Figure 3A:
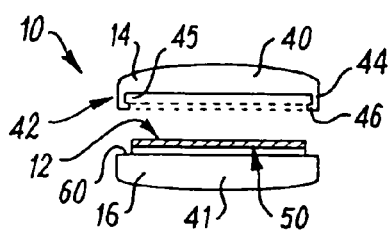
FIG. 3a is a diagrammatic end view of a telephone according to a first embodiment of the invention, with its cover in a disassembled condition.
Figure 3B:
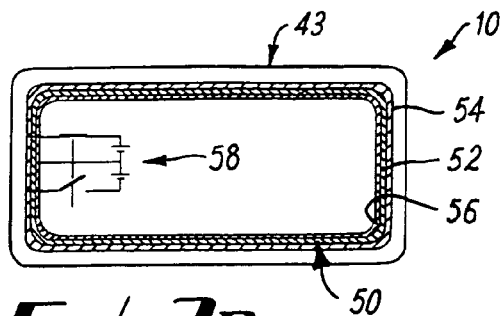
FIG. 3b is a diagrammatic view of the bottom cover of the telephone of FIG. 3a, viewed from above.
Figure 4A:
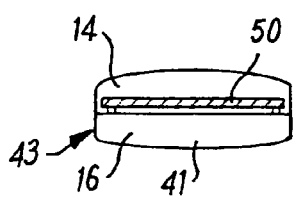
FIG. 4a is a diagrammatic part sectional end view of the telephone of FIG. 3a with the cover in an assembled condition.
Figure 4B:
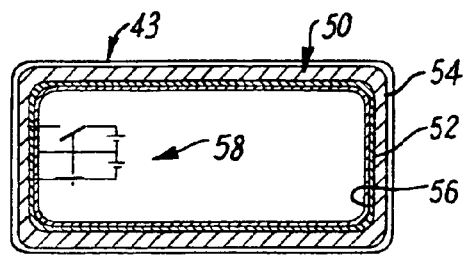
FIG. 4b is a diagrammatic view of the bottom cover of the telephone of FIG. 4a showing the polymer actuator in a condition in which it maintains the cover closed.
Figure 5A:
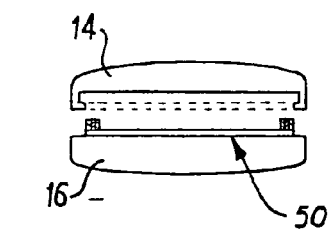
FIG. 5a is a diagrammatic end view of a telephone according to a second embodiment of the invention, with its cover in a disassembled condition.
Figure 5B:
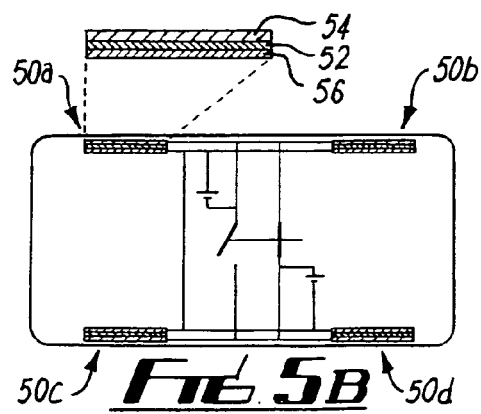
FIG. 5b is a diagrammatic view of the bottom cover of the telephone of FIG. 5a viewed from above.
Figure 6A:
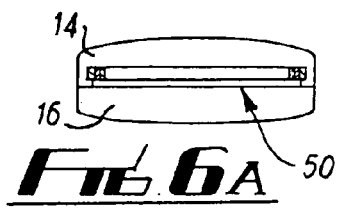
FIG. 6a is a diagrammatic part sectional end view of the telephone of FIG. 5a with the cover in an assembled condition.
Figure 6B:
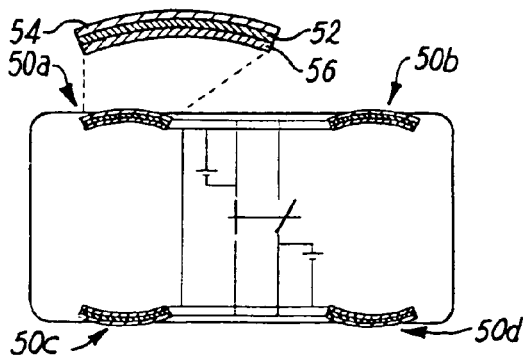
FIG. 6b is a diagrammatic view of the bottom cover of the telephone of FIG. 6a showing the polymer actuator in a condition in which it maintains the cover closed.

Referring also to FIGS. 4a and 4b, the polymer actuator 50 may be controlled by the selective application of voltage to alter its configuration. The configuration may be altered between a first configuration illustrated in FIGS. 4a and 4b and a second configuration illustrated in FIGS. 3a and 3b.

The alteration of the configuration of the polymer actuator 50 is caused by the doping/dedoping of anions inside the polymer chain of the conductive polymer 54. The charge state of the conductive polymer may be stopped at any level of charging and keep that state without the application of a voltage being necessary. The polymer actuator 50 is therefore bistable, i.e. stable in either its first or second configuration, without the application of any voltage.

A suitable material for the conductive polymer is polyrrole, polyariline or polythiothene. The metal electrode may comprise gold.

Referring to FIGS. 3a and 3b, when a voltage is applied to the polymer actuator, the conducting polymer 54 is caused to shrink in the plane of the page of FIG. 3b. Once the polymer has shrunk into this configuration, the voltage need no longer be applied to maintain this configuration.

Referring to FIGS. 4a and 4b, when a voltage of an opposite polarity is applied, the conducting polymer 54 expands in the plane of the page.

The front and back cover parts 14, 16 of the telephone 10 function as follows. Initially, the voltage source 58 is used to apply a voltage with a given polarity to the polymer actuator 50, which therefore shrinks into the configuration illustrated in FIGS. 3a and 3b. With the polymer actuator 50 in this configuration, the front cover part 14 may be brought into contact with the back cover part 16, with its flange 44, including the lip 46, passing by the polymer actuator 50. The lip 46 then contacts an outermost part 60 of the back cover part 16. Once the front cover part 14 is in this position, the voltage source 58 may be caused to apply voltage with an opposite polarity to the polymer actuator 50. The conducting polymer expands (in the plane of FIG. 4b) and the polymer actuator 50 alters to the configuration illustrated in FIGS. 4a and 4b, the polymer actuator 50 thereby entering the recess 45 formed between the body portion 40 of the front cover part 14 and the lip 46. When the polymer actuator 50 extends into the recess 45, the front cover part 14 is prevented from being removed from the back cover part 16 and the engine assembly is therefore firmly enclosed within the cover parts 14 and 16.

Thus, by the selective application of voltage to the polymer actuator 50, the polymer actuator 50 may be altered between first and second configurations, causing the closing arrangement to be altered between a first condition in which the cover parts 14, 16 are retained on the engine assembly 12 and a second condition in which at least one of the cover parts may be removed from the engine assembly.

The polymer actuator 50 is relatively flexible, and its flexibility allows it also to form a substantially watertight seal between the front and back cover parts 14, 16, thereby protecting the engine assembly from water ingress.

FIGS. 5a to 6b illustrate an alternative embodiment of the invention in which equivalent components are given the same reference numerals as in FIGS. 3a to 4b. This embodiment is generally similar to the previous embodiment except that the polymer actuator 50 in this embodiment is formed as four separate actuator elements 50a to 50d each including a conducting polymer 54, a solid electrolyte 52 and an electrode 56. In this case, the polymer actuator moves between the configuration illustrated in FIGS. 5a and 5b, in which the front cover part 14 may be removed from the back cover part 16, and the configuration illustrated in FIGS. 6a and 6b in which such removal is prevented. In this embodiment, the expansion and contraction of the conductive polymer 54 in each polymer actuator element 50a and 50d causes the polymer actuator element to move between a substantially straight configuration and a curved configuration in which it engages in the recess 62.

The selective actuation of the voltage source 58 to alter the configuration of the polymer actuator 50 and allow the cover part to be removed may be caused for example by a user inputting a PIN or other security code. Alternatively or additionally, disassembly could be triggered from an external device or via a network and therefore could be triggered automatically, for example, in the event of the telephone being stolen.

The disassembly may also be automatic, for example when disposing of the telephone, and the polymer actuator could be operated in such a way that it pushes the parts away from each other. The telephone could be prevented from operating with its cover part in the disassembled condition.

The polymer actuators may allow shielding integration into the covers.

Removal of the covers could be made impossible without knowing a security code, this acting as a security feature.

Various modifications may be made to the above described embodiments without departing from the scope of the invention. For example, different polymer actuators may be utilised, such as electrostrictive polymer artificial muscle (EPAM) actuators. An EPAM actuator has a performance which is similar to that of natural muscle. In an EPAM actuator, a non-conductive polymer such as, for example, silicone rubber (polydimethylsiloxane) or polyurethane is sandwiched between compliant electrodes. The compliant electrodes may comprise powdered graphite which is brushed onto the polymer through a stencil or may comprise a polymer filled with very fine conductive particles, such as carbon black, although this adds some stiffness. These conductive polymer materials are applied by spraying or dipping.

In an EPAM actuator, the thickness of the polymer between the electrodes should be uniform, in order to keep the electric field constant throughout the polymer and avoid areas where electrical breakdown may occur. The polymer may comprise a film which may be fabricated by spin coating.

RFID tags may be incorporated into the cover parts allowing information about the cover parts to be "read" by the closing arrangement, allowing the polymer actuators to be positioned differently for respectively different cover parts.

Although a two part cover is shown, the cover may have multiple parts and one or more of the parts may be attached to the engine assembly or to another cover part, using polymer actuators.

In the illustrated embodiments, the polymer actuator(s) expand into a recess in order to retain the cover part in place. Alternatively, expansion of the polymer actuator in a particular dimension could push the cover part out of engagement with another cover part or the engine assembly, to release the cover part.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A hand-portable device including:
   an engine assembly;
   a cover for encasing the engine assembly; and
   a closing arrangement alterable between a first condition in which it retains at least a part of the cover on the engine assembly and a second condition in which it allows the part of the cover to be removed from the engine assembly;
   the closing arrangement including a polymer actuator which is alterable between a first configuration and a second configuration to alter the closing arrangement between the first and second conditions respectively, wherein the polymer actuator includes an electroactive polymer, the electroactive polymer being a polymer which is capable of converting electrical to mechanical energy, wherein the polymer actuator is bistable, such that voltage is arranged to be applied to alter the polymer actuator between its first and second configurations, but application of voltage is not necessary to maintain it in either its first or its second configuration.

2. A hand-portable device according to claim 1, wherein the closing arrangement includes means for altering the configuration of the polymer actuator between the first configuration and the second configuration by selectively applying a voltage to the polymer actuator.

3. A hand-portable device according to claim 2, wherein the polymer actuator includes a conductive polymer.

4. A hand-portable device including:
   an engine assembly;
   a cover for encasing the engine assembly; and
   a closing arrangement alterable between a first condition in which it retains at least a part of the cover on the engine assembly and a second condition in which it allows the part of the cover to be removed from the engine assembly;
   the closing arrangement including a polymer actuator which is alterable between a first configuration and a second configuration to alter the closing arrangement between the first and second conditions respectively, wherein the polymer actuator includes an electroactive polymer, the electroactive polymer being a polymer which is capable of converting electrical to mechanical energy, wherein the polymer actuator is bistable, such that voltage is arranged to be applied to alter the polymer actuator between its first and second configurations, but application of voltage is not necessary to maintain it in either its first or its second configurations, wherein the polymer actuator includes a conductive polymer, wherein the polymer actuator further includes an electrolyte sandwiched between two electrodes, one of the electrodes comprising the conductive polymer.

5. A hand-portable device according to claim 1, wherein the polymer actuator in its first condition mechanically retains the cover on the engine assembly.

6. A hand-portable device according to claim 1, wherein the device is configured such that when the closing arrangement is in the second condition, at least a part of the cover is forced out of contact with the engine assembly.

7. A hand-portable device according to claim 1, wherein the device includes input means for allowing the input of security information to control the selective alteration of the polymer actuator between the first and second configurations.

8. A hand-portable device according to claim 7, wherein the security information comprises a code that is one of a numeric, alpha and alphanumeric code.

9. A hand-portable device according to claim 7, wherein the hand portable device includes a receiver for receiving the security information from a remote source.

10. A hand-portable device including:
    an engine assembly;
    a cover for encasing the engine assembly; and
    a closing arrangement alterable between a first condition in which it retains at least a part of the cover on the engine assembly and a second condition in which it allows the part of the cover to be removed from the engine assembly;
    the closing arrangement including a polymer actuator which is alterable between a first configuration and a second configuration to alter the closing arrangement between the first and second conditions respectively, wherein the hand-portable device is configured such that it becomes partially or completely non-functional if the cover is removed from the engine assembly in the absence of input of predetermined security information, wherein the polymer actuator is bistable, such that voltage is arranged to be applied to alter the polymer actuator between its first and second configurations, but application of voltage is not necessary to maintain it in either its first or its second configuration.

11. A hand-portable device according to claim 1, wherein the cover includes at least two cover parts which are detachable from the engine assembly, the cover being retained on the engine assembly by attaching the cover parts together to encase the engine assembly or by attaching each cover part to the engine assembly.

12. A hand-portable device according to claim 1, wherein the cover includes one cover part which is permanently attached to the engine assembly and one cover part which is detachable from the engine assembly, the cover being retained on the engine assembly by attaching the detachable cover part to the other cover part or to the engine assembly.

13. A hand-portable device according to claim 11, wherein the closing arrangement is arranged to selectively retain together first and second closure portions of the hand-portable device, in order to selectively retain the part of cover on the engine assembly, the first closure portion being on one cover part and the second closure portion on the other cover part, or the first closure portion being on one of the cover parts and the second closure portion on the engine assembly.

14. A hand-portable device according to claim 13, wherein the device is configured such that when the two closure portions are retained together by the closing arrangement, a waterproof seal is formed between the closure portions.

15. A hand-portable device according to claim 13, wherein the polymer actuator is located in one of the closure portions, and the other closure portion is shaped to define a recess into which the polymer actuator is adapted to extend when in its first condition, to retain the two closure portions together and thereby retain the cover on the engine assembly.

16. A hand-portable device according to claim 15, wherein each cover part of the hand-portable device includes a body portion for covering a back or front of the engine assembly and a perimeter portion, the respective perimeter portions contacting one another when the cover encases the engine assembly, the perimeter portions of the cover parts comprising the closure portions.

17. A hand-portable device including:
an engine assembly;
a cover for encasing the engine assembly; and
a closing arrangement alterable between a first condition in which it retains at least a part of the cover on the engine assembly and a second condition in which it allows the part of the cover to be removed from the engine assembly;
the closing arrangement including a polymer actuator which is alterable between a first configuration and a second configuration to alter the closing arrangement between the first and second conditions respectively, wherein the polymer actuator includes an electroactive polymer, the electroactive polymer being a polymer which is capable of converting electrical to mechanical energy, wherein the polymer actuator is bistable, such that voltage is arranged to be applied to alter the polymer actuator between its first and second configurations, but application of voltage is not necessary to maintain it in either its first or its second configuration, wherein the cover includes at least two cover parts which are detachable from the engine assembly, the cover being retained on the engine assembly by attaching the cover parts together to encase the engine assembly or by attaching each cover part to the engine assembly, wherein the closing arrangement is arranged to selectively retain together first and second closure portions of the hand-portable device, in order to selectively retain the part of cover on the engine assembly, the first closure portion being on one cover part and the second closure portion on the other cover part, or the first closure portion being on one of the cover parts and the second closure portion on the engine assembly, wherein the polymer actuator is located in one of the closure portions, and the other closure portion is shaped to define a recess into which the polymer actuator is arranged to extend when in its first condition, to retain the two closure portions together and thereby retain the cover on the engine assembly, wherein the polymer actuator extends substantially around a perimeter portion of one cover part and the recess extends substantially around the perimeter portion of the other cover part, the polymer actuator on the one cover part selectively extending into the recess on the other cover part to retain the two cover parts together.

18. A hand-portable device according to claim 16, wherein a plurality of discrete polymer actuators are provided around the perimeter portion of one cover part, with complimentary recesses being defined within the other cover part.

19. A cover part for a hand-portable device according to claim 1, the cover part including a polymer actuator, the configuration of which is arranged to be altered to alter the condition of the closing arrangement of the hand-portable device.

20. A method of comprising:
providing a hand-portable device including an engine assembly,
a cover for encasing the engine assembly and a closing arrangement comprising a polymer actuator having a first configuration and a second configuration, the method including altering the configuration of the polymer actuator between the first and second configurations, to alter the closing arrangement between a first condition in which it retains at least a part of the cover on the engine assembly and a second condition in which the part of the cover is adapted to be removed from the engine assembly, wherein the method includes altering the configuration of the polymer actuator by the selective application of a voltage to the polymer actuator, wherein the polymer actuator is bistable, such that voltage is arranged to be applied to alter the polymer actuator between its first and second configurations, but application of voltage is not necessary to maintain it in either its first or its second configuration.

21. A method according to claim 20, wherein the selective application of the voltage is controlled by the input of security information to the hand-portable device.

22. A method according to claim 21, wherein the security information is input via a user input of the hand-portable device.

23. A method according to claim 21, wherein the security information is input from a remote source that is one of an external device and via a communications network.

24. A method according to claim 21, wherein the security information is input from a remote source that is one of an external device and via a communications network.

25. A hand-portable device including an engine assembly and a cover encasing the engine assembly, the cover being formed in at least two parts and the device including a sealing arrangement for sealing between the two parts or between one of the cover parts and the engine assembly, the sealing arrangement including a polymer actuator, wherein the polymer actuator includes an electroactive polymer, the electroactive polymer being a polymer which is capable of converting electrical to mechanical energy, wherein the polymer actuator is bistable, such that voltage is arranged to be applied to alter the polymer actuator between its first and second configurations, but application of voltage is not necessary to maintain it in either its first or its second configuration.

\* \* \* \* \*